(12) United States Patent
Jinbo

(10) Patent No.: US 12,194,622 B2
(45) Date of Patent: Jan. 14, 2025

(54) BALANCER AND ROBOT SYSTEM

(71) Applicant: FANUC CORPORATION, Yamanashi (JP)

(72) Inventor: Ryouhei Jinbo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/023,258

(22) PCT Filed: Sep. 13, 2021

(86) PCT No.: PCT/JP2021/033466
§ 371 (c)(1),
(2) Date: Feb. 24, 2023

(87) PCT Pub. No.: WO2022/059632
PCT Pub. Date: Mar. 24, 2022

(65) Prior Publication Data
US 2023/0311345 A1     Oct. 5, 2023

(30) Foreign Application Priority Data
Sep. 17, 2020     (JP) ................................. 2020-156358

(51) Int. Cl.
*B25J 19/00*     (2006.01)
*B25J 19/06*     (2006.01)

(52) U.S. Cl.
CPC ........... *B25J 19/0016* (2013.01); *B25J 19/06* (2013.01)

(58) Field of Classification Search
CPC ...... B25J 19/0016; B25J 19/06; B25J 13/086; F16C 19/52; G01M 13/04
See application file for complete search history.

(56) References Cited

U.S. PATENT DOCUMENTS

| 9,221,182 B2 * | 12/2015 | Broberg | B25J 19/0079 |
| 10,345,193 B2 * | 7/2019 | Jakobsen | G01M 13/04 |
| 2023/0408373 A1 * | 12/2023 | Landrieve | F16C 19/522 |

FOREIGN PATENT DOCUMENTS

| JP | S60-061188 U | 4/1985 |
| JP | H05031688 A | 2/1993 |
| JP | H05-228884 A | 9/1993 |
| JP | H06-262561 A | 9/1994 |
| JP | H08-090484 A | 4/1996 |
| JP | H10-015874 A | 1/1998 |

(Continued)

*Primary Examiner* — William C Joyce
(74) *Attorney, Agent, or Firm* — Renner, Otto, Boisselle & Sklar, LLP

(57) ABSTRACT

A balancer includes a housing attached to one of a first member and a second member that is rotationally driven with respect to the first member about a rotation axis in a robot including the first member and the second member. The housing is rotatable about a first attachment axis parallel to the rotation axis. A rod has one end attached to another one of the first member and the second member to be rotatable about a second attachment axis parallel to the rotation axis. A force generator generates a force in a direction in which the rod is drawn into the housing or in a direction in which the rod is pushed out of the housing. A sensor detects a positional relationship between the housing and the rod in a direction orthogonal to the first attachment axis and the second attachment axis.

5 Claims, 12 Drawing Sheets

(56) References Cited

FOREIGN PATENT DOCUMENTS

| | | |
|---|---|---|
| JP | H10-225891 A | 8/1998 |
| JP | H11-010579 A | 1/1999 |
| JP | 2007-007762 A | 1/2007 |
| JP | 2014-193516 A | 10/2014 |
| JP | 2014195849 A | 10/2014 |
| JP | 2019188513 A | 10/2019 |
| JP | 2020085831 A | 6/2020 |
| WO | WO-2012086055 A1 | 6/2012 |
| WO | WO-2019130233 A1 * 7/2019 ............. G01D 5/145 |

* cited by examiner

BALANCER AND ROBOT SYSTEM

TECHNICAL FIELD

The present disclosure relates to a balancer and a robot system.

BACKGROUND ART

There is a known balancer disposed between a revolving drum of a robot and a first arm that is rotationally driven with respect to the revolving drum about a horizontal first axis, for compensating for the gravitational load acting on the first arm (for example, see Patent Literature 1).

In the robot provided with the balancer, a current value of a motor that rotationally drives the first arm with respect to the revolving drum is monitored, and a decrease in the generative force of the balancer is detected.

CITATION LIST

Patent Literature

{PTL 1} Japanese Unexamined Patent Application, Publication No. 2014-195849

SUMMARY OF INVENTION

Solution to Problem

An aspect of the present disclosure is directed to a balancer including: a housing that is attached to one of a first member and a second member that is rotationally driven with respect to the first member about a rotation axis in a robot including the first member and the second member, so as to be rotatable, by means of first bearings, about a first attachment axis parallel to the rotation axis; a rod that has one end attached to an other one of the first member and the second member so as to be rotatable, by means of a second bearing, about a second attachment axis parallel to the rotation axis; a force generating means that generates a force in a direction in which the rod is drawn into the housing or in a direction in which the rod is pushed out of the housing; and a sensor that detects at least one of a positional relationship between the first attachment axis and the housing and a positional relationship between the second attachment axis and the rod, in a direction orthogonal to the first attachment axis and the second attachment axis.

DESCRIPTION OF EMBODIMENT

A balancer 1 and a robot system 100 according to an embodiment of the present disclosure will be described below with reference to the drawings.

Figure 1:
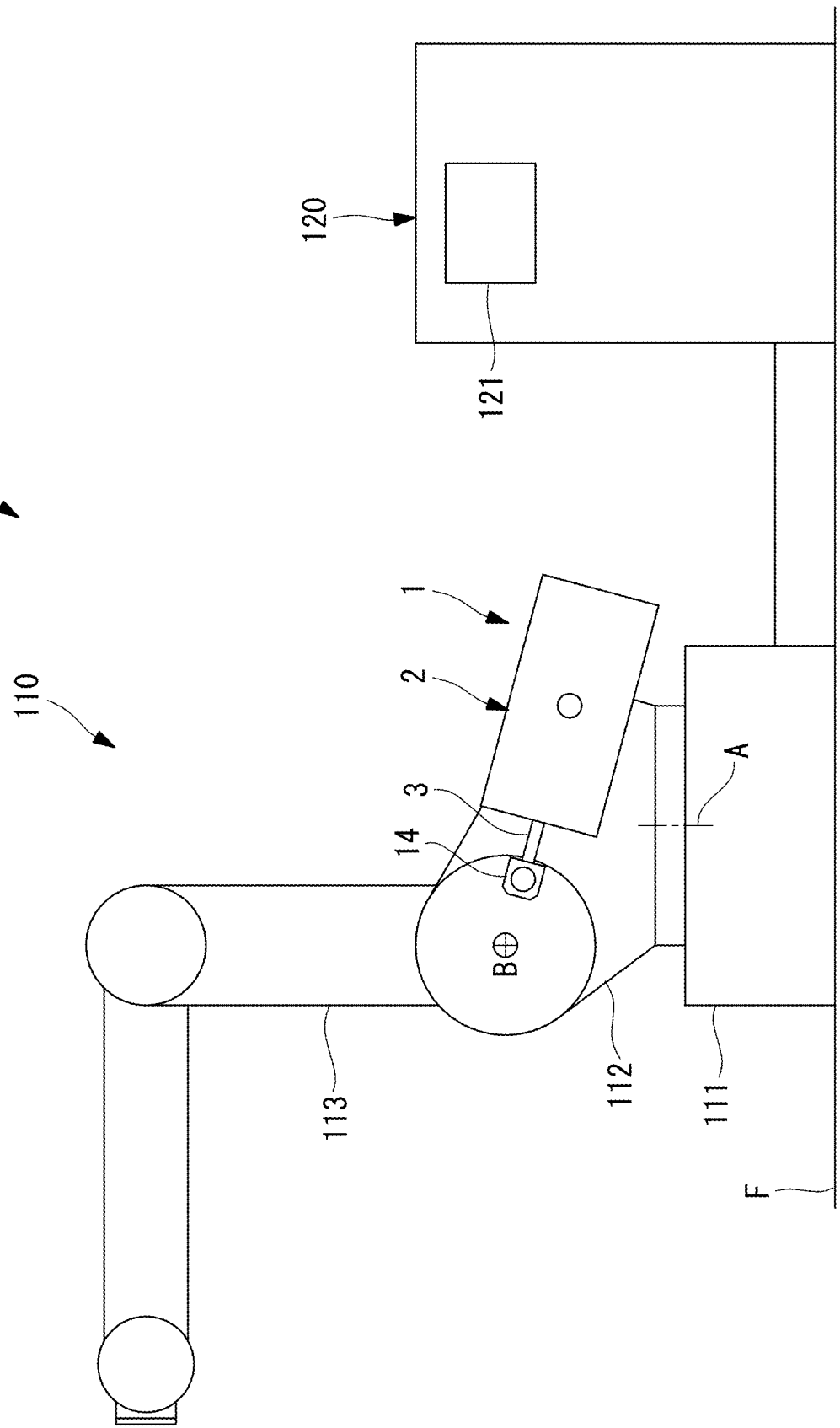
FIG. 1 is an overall configuration diagram showing a robot system according to an embodiment of the present disclosure.

As shown in FIG. 1, the robot system 100 according to this embodiment includes a robot 110 and a controller 120 that controls the robot 110.

The robot 110 is, for example, a vertical six-axis articulated robot. The robot 110 includes: a base 111 that is installed on a floor F; a revolving drum (first member) 112 that is rotatable with respect to the base 111 about a first axis A extending in the vertical direction; a first arm (second member) 113 that is rotatable with respect to the revolving drum 112 about a horizontal second axis (rotation axis) B; and the balancer 1.

Figure 2:
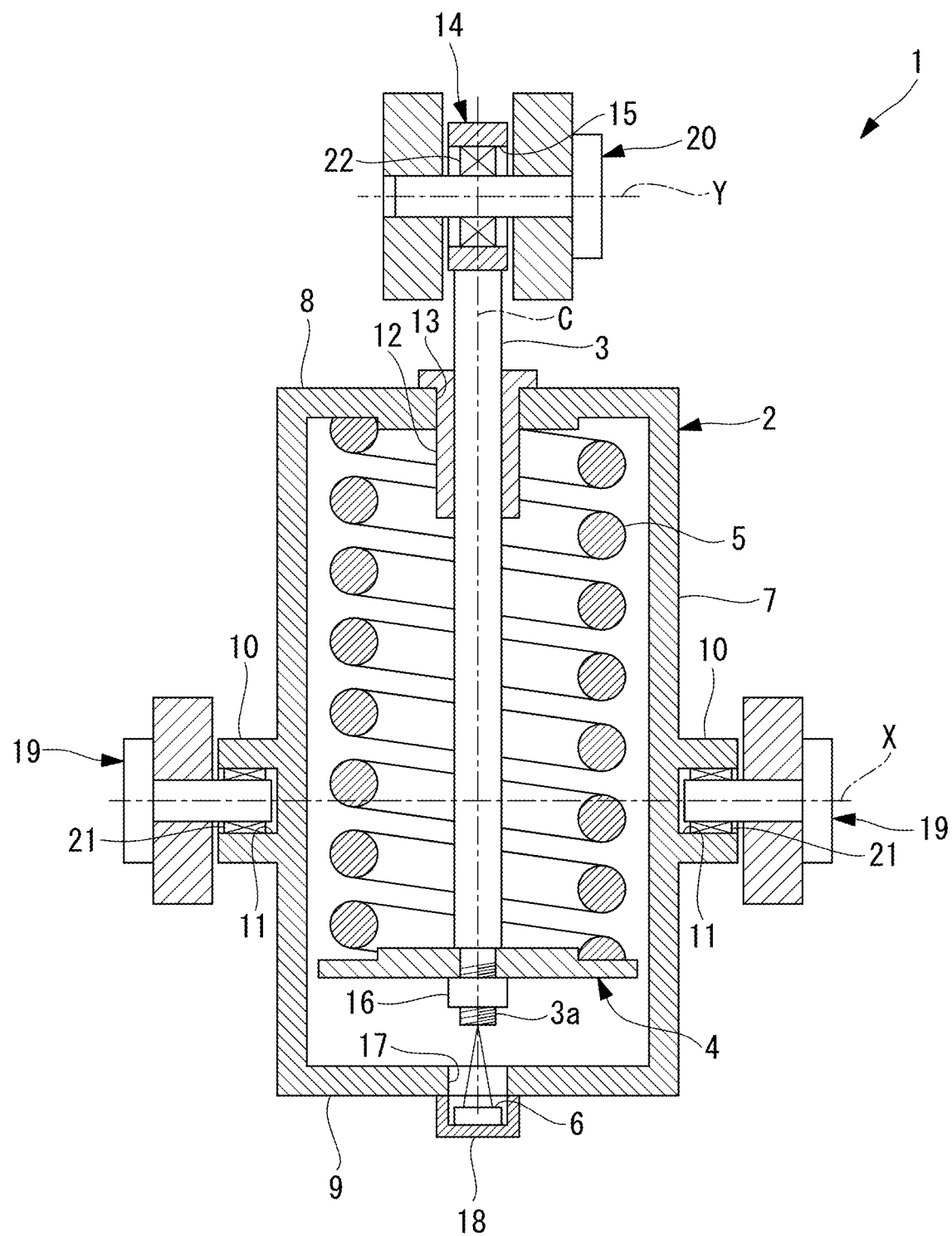
FIG. 2 is a longitudinal sectional view showing a balancer according to an embodiment of the present disclosure.

As shown in FIG. 2, the balancer 1 includes a housing 2, a rod 3, a movable plate (movable member) 4, a compression coil spring (force generating means) 5, and a sensor 6.

The housing 2 includes: a cylindrical body portion 7; a flat plate-shaped front end plate (end plate) 8 and rear end plate (end plate) 9 that close both ends in the axial direction of the body portion 7; and a bearing 12 that is disposed on the front end plate 8 and that supports the rod 3 so as to be movable in the longitudinal direction.

A pair of attachment portions 10 are provided on the outer circumferential surface of the body portion 7, at intermediate positions in the axial direction, so as to be arranged diametrically opposite to each other across an axis. Each of the attachment portions 10 is formed in a cylindrical shape extending radially outward from the outer circumferential surface of the body portion 7, in the opposite direction on the same straight line, and is provided with an inner hole 11 having a circular cross section.

The front end plate 8 is provided with, at the center thereof, a through-hole 13 penetrating in the plate thickness direction, the bearing 12 is disposed in the through-hole 13, and the rod 3 is supported by the inserted bearing 12 so as to be movable in the axial direction of the body portion 7. An attachment bracket 14 is fixed to one end of the rod 3, which is disposed outside the housing 2. The attachment bracket 14 is provided with a through-hole 15 penetrating in a direction orthogonal to a longitudinal axis C of the rod 3.

The movable plate 4 is fixed to the other end of the rod 3, which is disposed inside the housing 2, by fastening a male screw 3a formed on the rod 3 and a nut 16. The movable plate 4 is formed in a disk shape having an outer diameter dimension slightly smaller than the inner diameter of the body portion 7.

In this embodiment, the compression coil spring 5 is disposed, in a compressed state, between the front end plate 8 through which the rod 3 passes and the movable plate 4. With this configuration, the rod 3 constantly receives the force generated by the compression coil spring 5 in a direction in which the rod 3 is drawn into the housing 2. In addition, when the rod 3 is moved in a direction in which the rod 3 is pulled out of the housing 2, the compression amount of the compression coil spring 5 increases and the force to draw the rod 3 into the housing 2 is increased.

The sensor 6 is, for example, a non-contact distance sensor, such as a laser displacement meter, and is fixed to the outside of the rear end plate 9 of the housing 2, radiates laser light toward the end of the rod 3 through a through-hole 17 provided in the rear end plate 9, and detects light reflected at the end of the rod 3. In the figures, reference sign 18 indicates a bracket for attaching the sensor 6 to the rear end plate 9 of the housing 2.

With this configuration, it is possible to measure the distance from the distal end of the sensor 6 to the end of the rod 3. Measuring the distance from the distal end of the sensor 6 fixed to the housing 2 to the end of the rod 3 means, in other words, detecting the positional relationship between the rod 3 and the housing 2.

The thus-configured balancer 1 is attached between the revolving drum 112 and the first arm 113 by means of a pair of first shafts 19 fixed to the revolving drum 112 and a second shaft 20 fixed to the first arm 113. The first shafts 19 and the second shaft 20 are arranged so as to be parallel to the second axis B with a spacing therebetween.

The first shafts 19 fixed to the revolving drum 112 are inserted in the inner holes 11 of the attachment portions 10 provided on the housing 2 of the balancer 1, and support the housing 2 so as to be rotatable about a first attachment axis X by means of bearings, for example, sliding bearings (first bearings) 21 that are disposed between outer surfaces of the first shafts 19 and inner surfaces of the inner holes 11.

The second shaft 20 fixed to the first arm 113 is inserted in the through-hole 15 provided in the attachment bracket 14 of the rod 3, and supports the rod 3 so as to be rotatable about a second attachment axis Y by means of a bearing, for example, a rolling bearing (second bearing) 22 that is disposed between an outer surface of the second shaft 20 and an inner surface of the through-hole 15.

With this configuration, when the first arm 113 is rotated about the second axis B with respect to the revolving drum 112, the second shaft 20 fixed to the first arm 113 moves about the second axis B, and as a result, the distance between the first attachment axis X and the second attachment axis Y changes and the compression amount of the compression coil spring 5 inside the housing 2 changes. In the state shown in FIG. 1 in which the first arm 113 is positioned in the vertical direction, the gravitational load torque acting on the first arm 113 is the smallest, and as the tilt angle with respect to the vertical direction increases as a result of the first arm 113 tilting forward or backward, the gravitational load torque acting on the first arm 113 increases.

Meanwhile, in the balancer 1, the compression amount of the compression coil spring 5 is larger in the state in which the first arm 113 is tilted forward or backward with respect to the vertical direction compared to the state in which the first arm 113 is positioned in the vertical direction. Furthermore, the distance between the second axis B and a plane including the first attachment axis X and the second attachment axis Y is larger in the state in which the first arm 113 is tilted forward or backward with respect to the vertical direction compared to the state in which the first arm 113 is positioned in the vertical direction.

As a result, it is possible to change the auxiliary torque generated by the balancer 1 in such a pattern that the auxiliary torque is increased when the gravitational load torque acting on the first arm 113 is large and is decreased when the gravitational load torque is small, thereby reducing the load on a motor over the entire operating range of the first arm 113.

The controller 120 includes at least one processor, at least one memory, and a display (notification unit) 121.

The controller 120 stores, in a normal state, a distance detected by the sensor 6 when the first arm 113 is positioned at a prescribed angle, for example, 0°, with respect to the revolving drum 112, in other words, when the first arm 113 is positioned in the vertical direction, as shown in FIG. 1.

Here, the normal state indicates a point in time when the sliding bearings 21 and the rolling bearing 22 that support the balancer 1 are not deteriorated, for example, when the robot 110 is shipped or immediately after the first and second bearings 21, 22 that support the balancer 1 are replaced. The distance to be stored may be a distance actually detected by the sensor 6, or a design value may be stored.

In addition, the processor of the controller 120 calculates a difference between a distance detected by the sensor 6 and the distance in the normal state, which is stored in the memory, in the state in which the first arm 113 is positioned in the vertical direction, the calculation being performed, by manual operation as needed, periodically or during operation of the robot 110. Then, the processor of the controller 120 determines whether or not the absolute value Δ of the calculated difference exceeds a prescribed threshold, and in a case in which it is determined that the absolute value Δ of the difference exceeds the threshold, the processor issues a notification on the display 121, indicating that an abnormal state has occurred in the balancer 1.

The operation of the thus-configured balancer 1 and robot system 100 according to this embodiment will be described below.

With the balancer 1 according to this embodiment, the resilient force of the compression coil spring 5 constantly acts in the direction in which the rod 3 is drawn into the housing 2. Therefore, in the sliding bearings 21 provided on the first shaft 19 side, only portions thereof on the rear sides of the first shafts 19 are subjected to a load due to the resilient force of the compression coil spring 5 in order to support the housing 2 that is pulled forward by means of the compression coil spring 5. In addition, in the rolling bearing 22 provided on the second shaft 20 side, only a portion thereof on the front side of the second shaft 20 is subjected to the load due to the resilient force of the compression coil spring 5 in order to support the rod 3 that is pulled backward by means of the compression coil spring 5.

Figure 3:
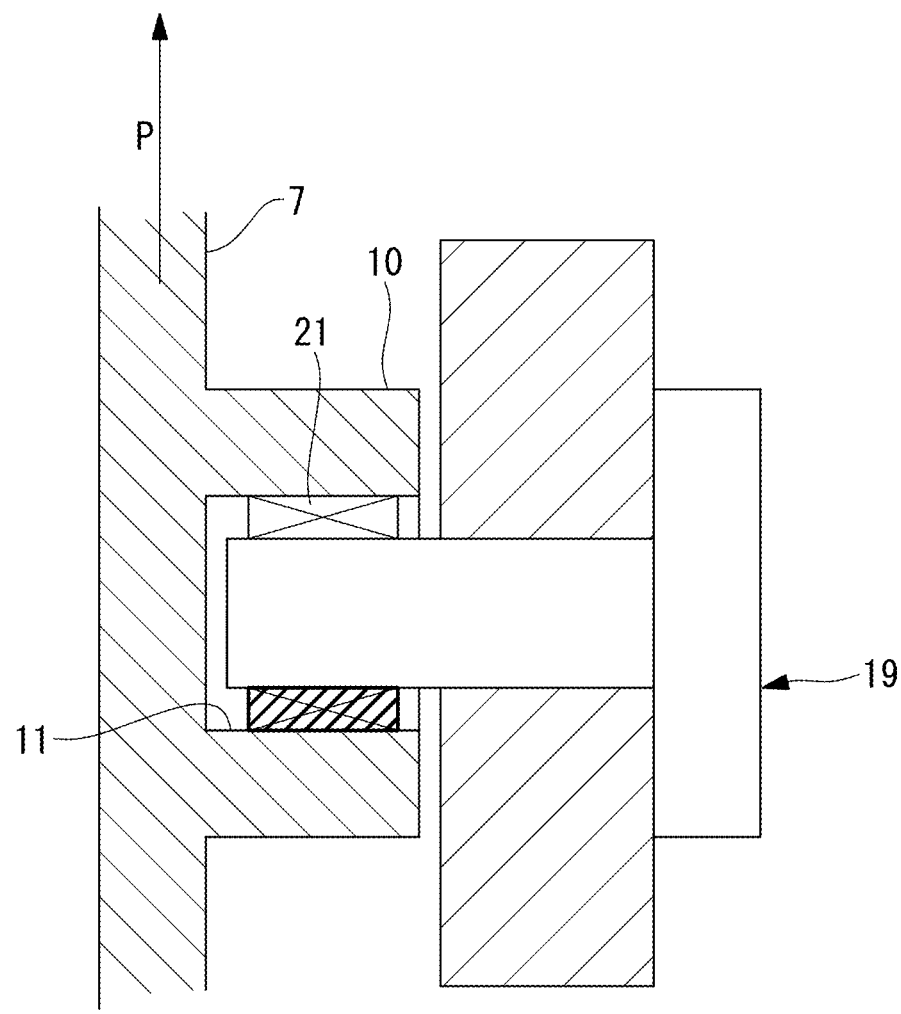
FIG. 3 is a partial longitudinal sectional view for explaining a movement direction of a housing of the balancer in FIG. 2 due to wear of bearings that rotatably support the housing and first shafts.
Figure 4:
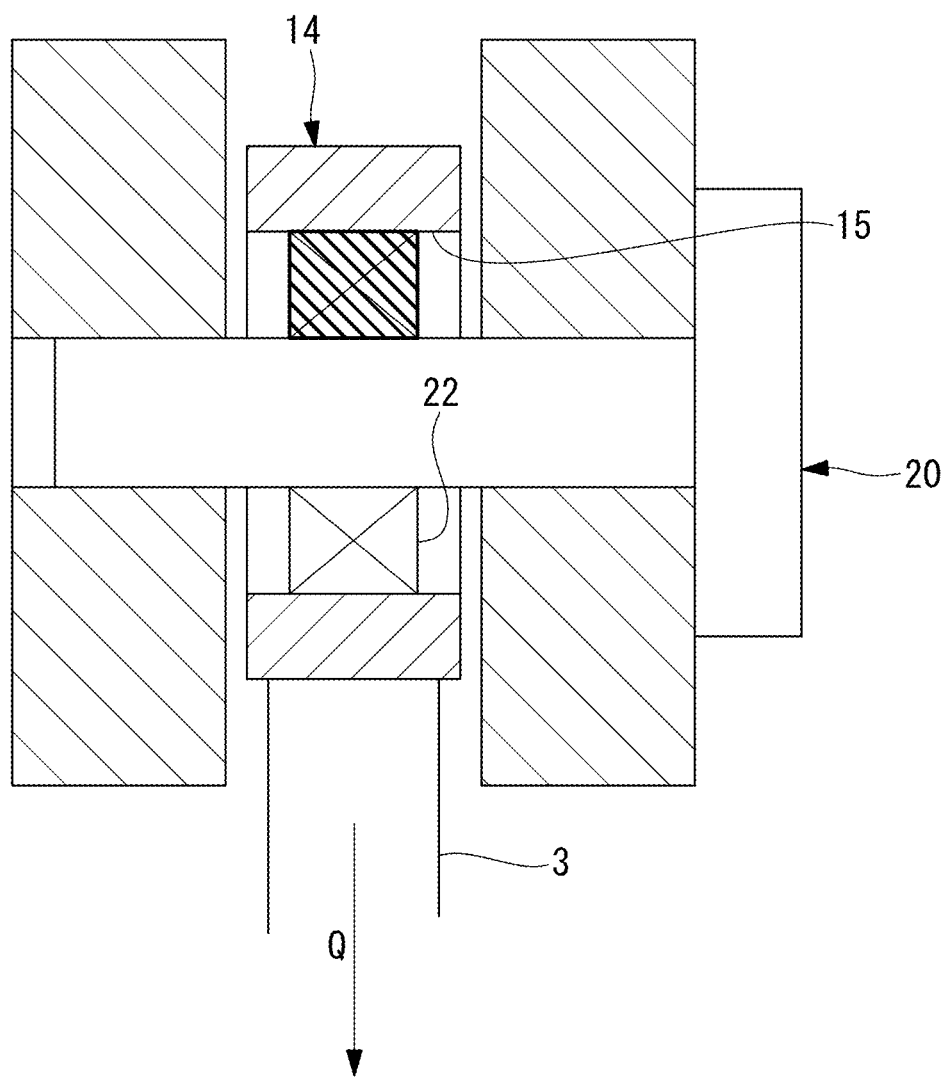
FIG. 4 is a partial longitudinal sectional view for explaining a movement direction of a rod of the balancer in FIG. 2 due to wear of a bearing that rotatably supports the rod and a second shaft.

In a case in which the sliding bearings 21 are worn out as a result of the robot 110 operating over a long period of time in the state in which the biased load constantly acts on the sliding bearings 21, as described above, the housing 2 moves forward with respect to the first shafts 19, as indicated by an arrow P in FIG. 3. In addition, in a case in which the rolling bearing 22 is worn out, as shown in FIG. 4, the rod 3 moves backward with respect to the second shaft 20, as indicated by an arrow Q. In FIGS. 3 and 4, it is assumed that the hatched portions of the bearings 21, 22 are worn out.

Figure 5:
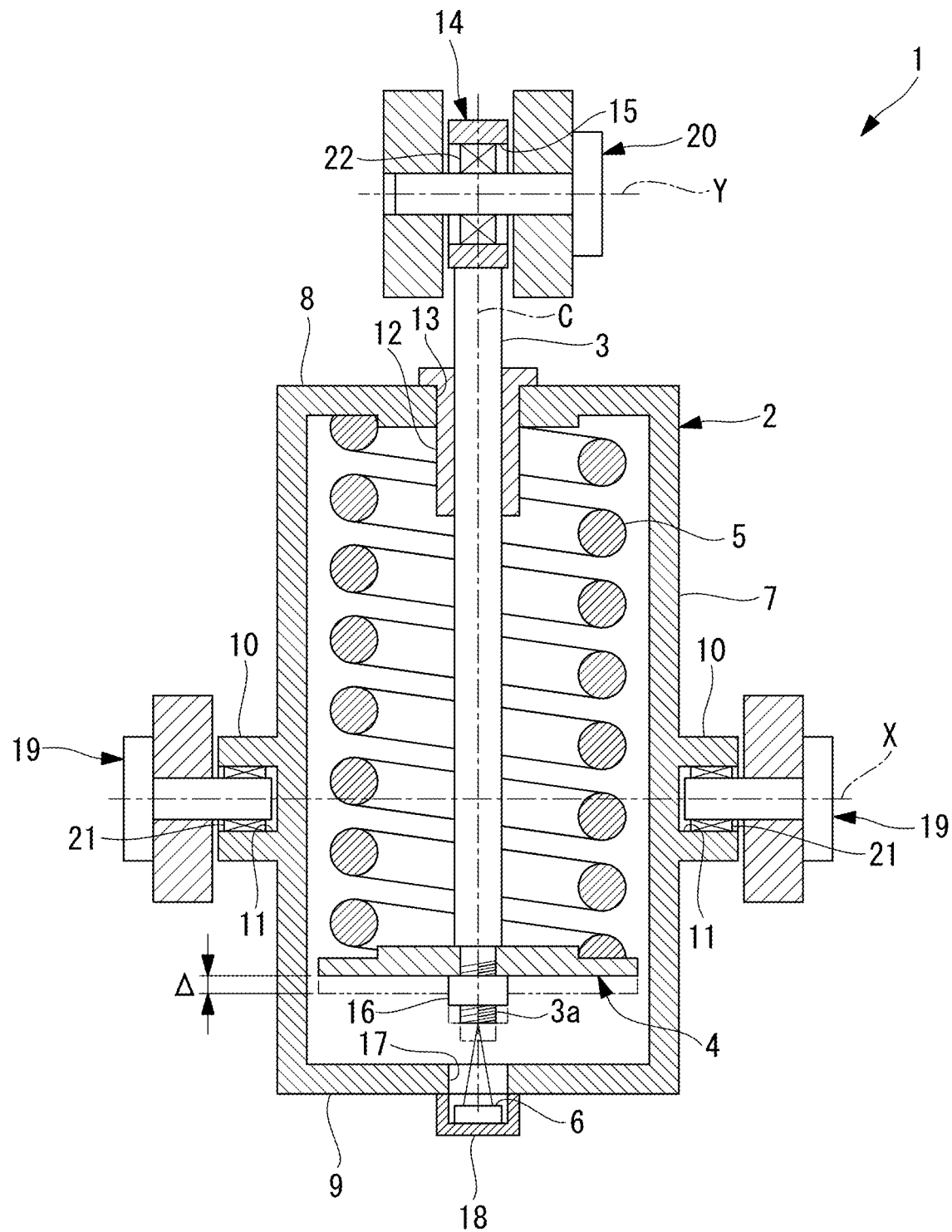
FIG. 5 is a longitudinal sectional view for explaining a difference between the distance detected by a sensor and the distance in a normal state in the balancer in FIG. 2.

As a result, in either of the case in which the sliding bearings 21 are worn out and the case in which the rolling bearing 22 is worn out, the distance detected by the sensor 6 becomes smaller than the stored distance in the normal state, as indicated by a chain line in FIG. 5.

With the robot system 100 according to this embodiment, in the case in which the absolute value Δ of the difference between the distance detected by the sensor 6 and the distance in the normal state exceeds the prescribed threshold, a notification indicating an abnormal state is issued on the display 121. With this configuration, there is an advantage in that it is possible to take measures, such as replacing the bearings 21, 22, before the wear of the sliding bearings 21 and the rolling bearing 22 that support the balancer 1 progresses further and adversely affects other components.

In other words, although it is difficult to detect the initial wear of the bearings 21, 22 by means of the current value of the motor, it is possible to detect an abnormal state and cope therewith by detecting the positional relationship between the rod 3 and the housing 2, which changes due to the wear. In particular, in a case in which the wear progresses simultaneously in the bearings 21, 22 that respectively support the housing 2 and the rod 3, it is possible to detect an abnormal state at an earlier stage by means of the sum of the wear amounts of the bearings 21, 22.

Figure 6:
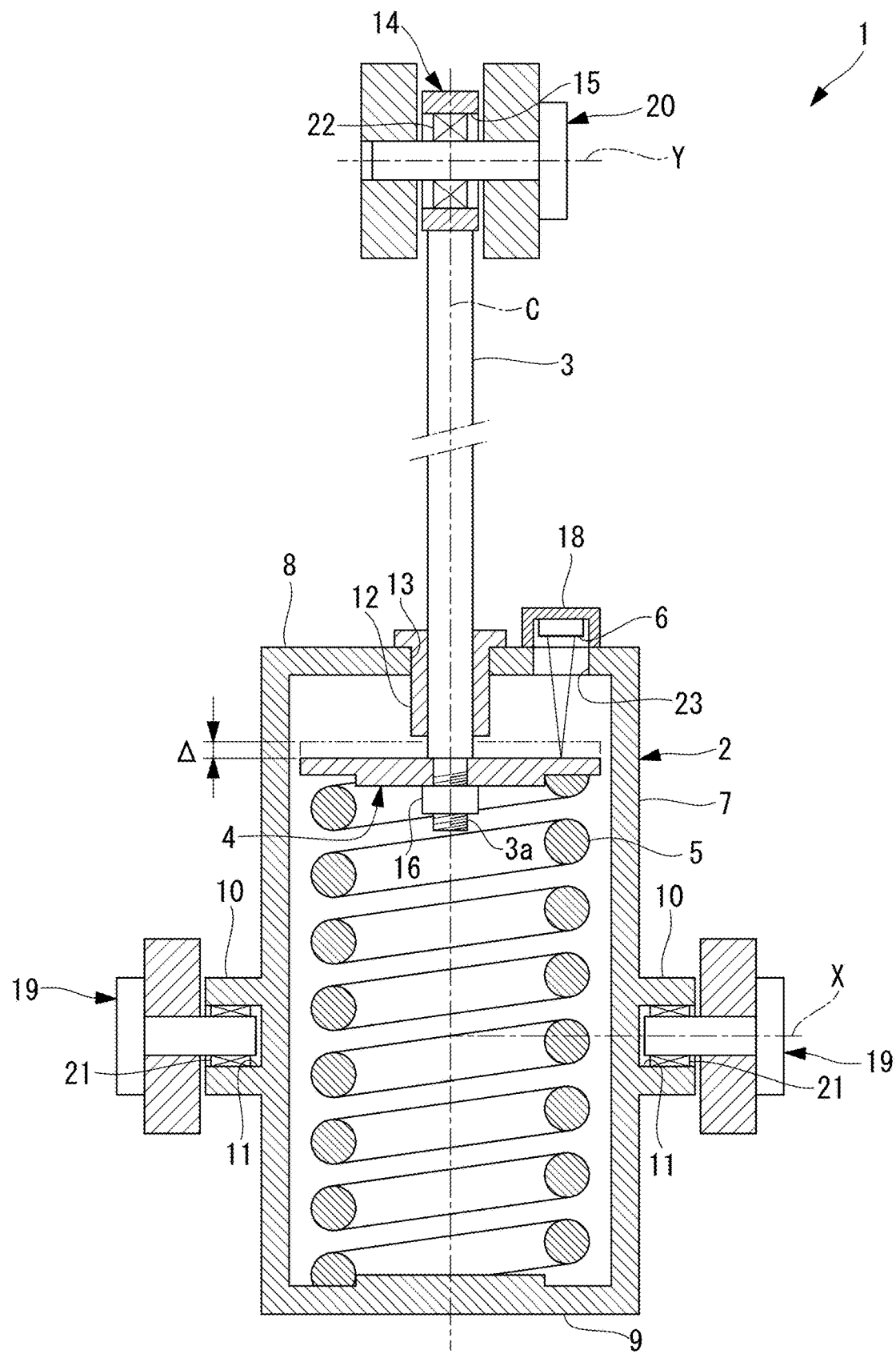
FIG. 6 is a longitudinal sectional view showing a modification of the balancer in FIG. 2.

Note that the balancer 1 in which a force is generated by the compression coil spring 5 in the direction in which the rod 3 is drawn into the housing 2 has been illustrated as an example in this embodiment. Alternatively, as shown in FIG. 6, it is permissible to employ a balancer 1 in which the compression coil spring 5 is disposed between the movable plate 4 and the rear end plate 9, and a force is generated by the compression coil spring 5 in a direction in which the rod 3 is pushed out of the housing 2.

In this case, a through-hole 23 may be provided in the front end plate 8, and a sensor 6, such as a laser displacement meter, that is fixed to the front end plate 8 may be employed to detect a distance therefrom to the movable plate 4. In addition, a distance detected by the sensor 6 in the normal state or a design value may be stored in advance, and it may be determined, as needed or periodically, whether or not the absolute value Δ of the difference between a distance detected by the sensor and the distance in the normal state exceeds a threshold.

Figure 7:
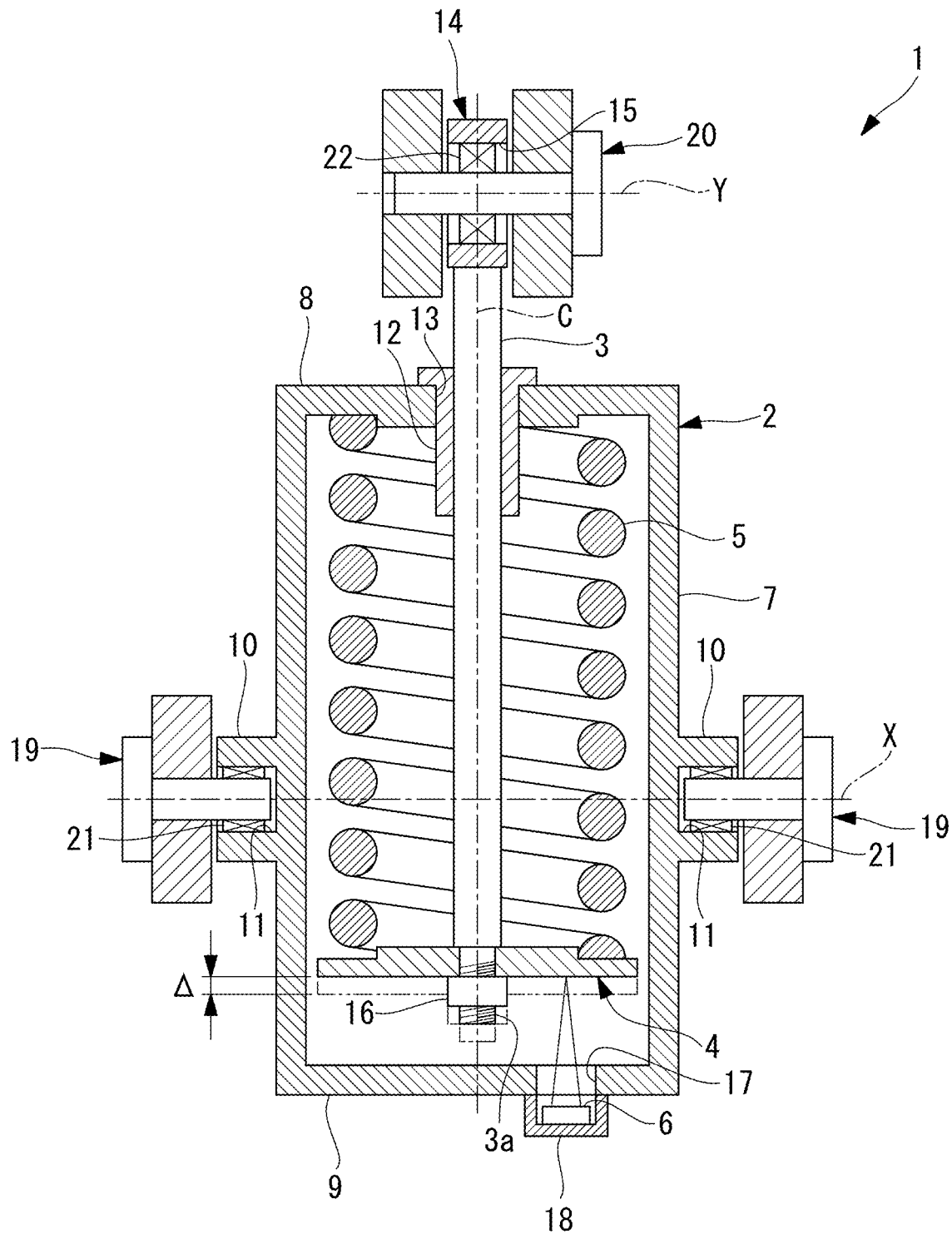
FIG. 7 is a longitudinal sectional view showing a modification of the arrangement of the sensor in the balancer in FIG. 2.

In addition, in this embodiment, a laser displacement meter fixed to the rear end plate 9 is employed as the sensor 6, and the laser light reflected at the end surface of the rod 3 is detected. Alternatively, as shown in FIG. 7, a distance to the movable plate 4 (or the nut 16) fixed to the rod 3 may be detected.

In addition, in this embodiment, the distance in the normal state is stored, and it is determined whether or not the absolute value Δ of the difference between the stored distance and the detected distance exceeds the threshold. With this configuration, it is possible to arbitrarily set the angle of the first arm 113 with respect to the revolving drum 112 when the distance is detected.

Alternatively, in a case in which the distance is detected at a stroke end of the rod 3, a distance obtained by subtracting the threshold from the distance in the normal state may be stored as a new threshold, and it may be determined whether or not the detected distance has become equal to or less than the new threshold. The distance corresponding to the new threshold is normally outside the stroke end and cannot be reached in the normal operating state of the robot 110. With this configuration, it is possible to detect an abnormal state at the point in time when the detected distance becomes equal to or less than the threshold, without setting the angle of the first arm 113 with respect to the revolving drum 112 when the distance is detected.

Figure 8:
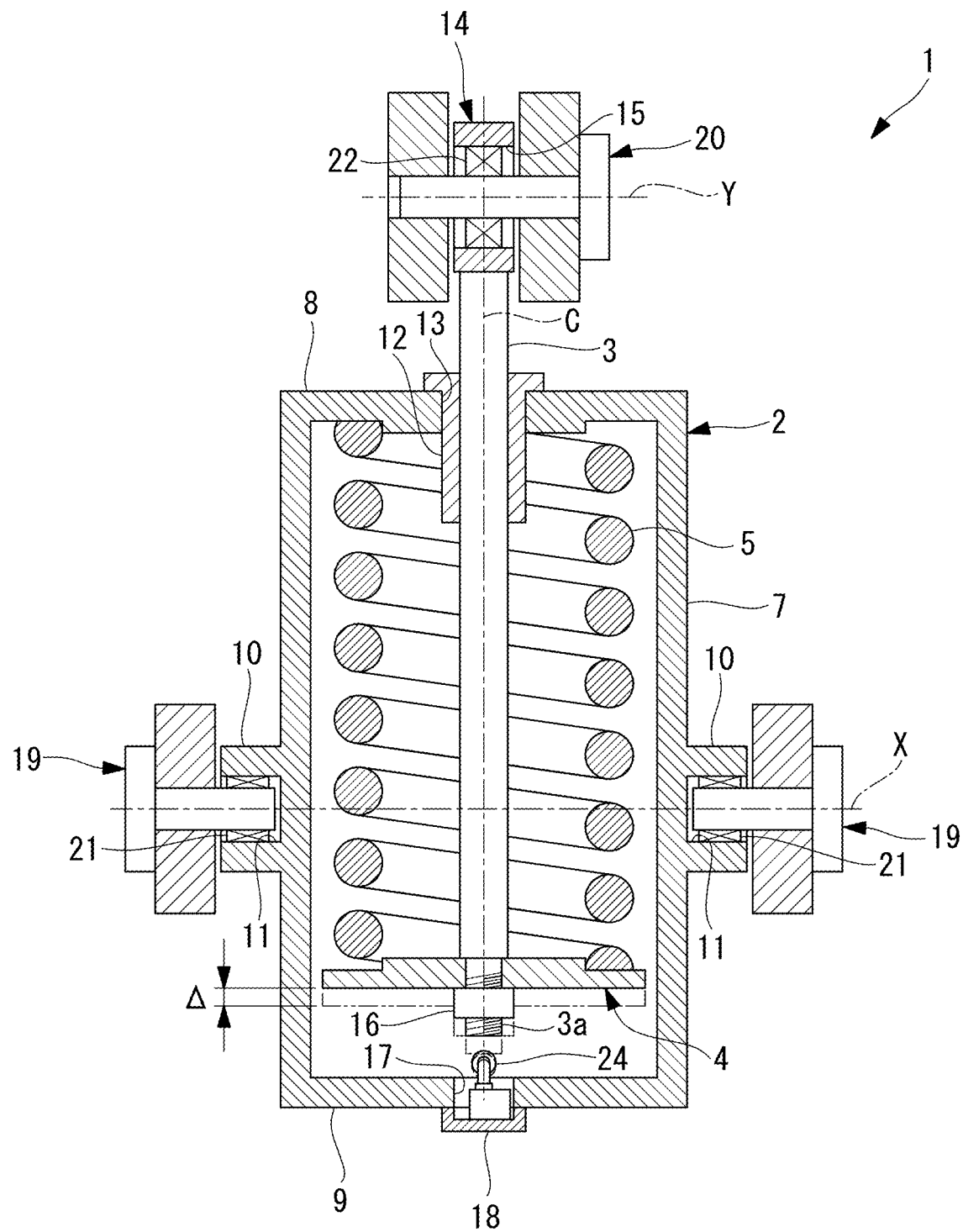
FIG. 8 is a longitudinal sectional view showing a modification of the sensor in the balancer in FIG. 2.

In addition, as shown in FIG. 8, a contact switch, such as a limit switch (switch) 24, or a non-contact switch, such as a proximity sensor, may be employed as the sensor instead of the distance sensor 6, such as a laser displacement meter. In this case also, the limit switch 24 is arranged so as to be activated at a position the rod 3 reaches beyond the stroke end, and thus, it is possible to detect an abnormal state at the point in time when the limit switch 24 is activated.

Figure 9:
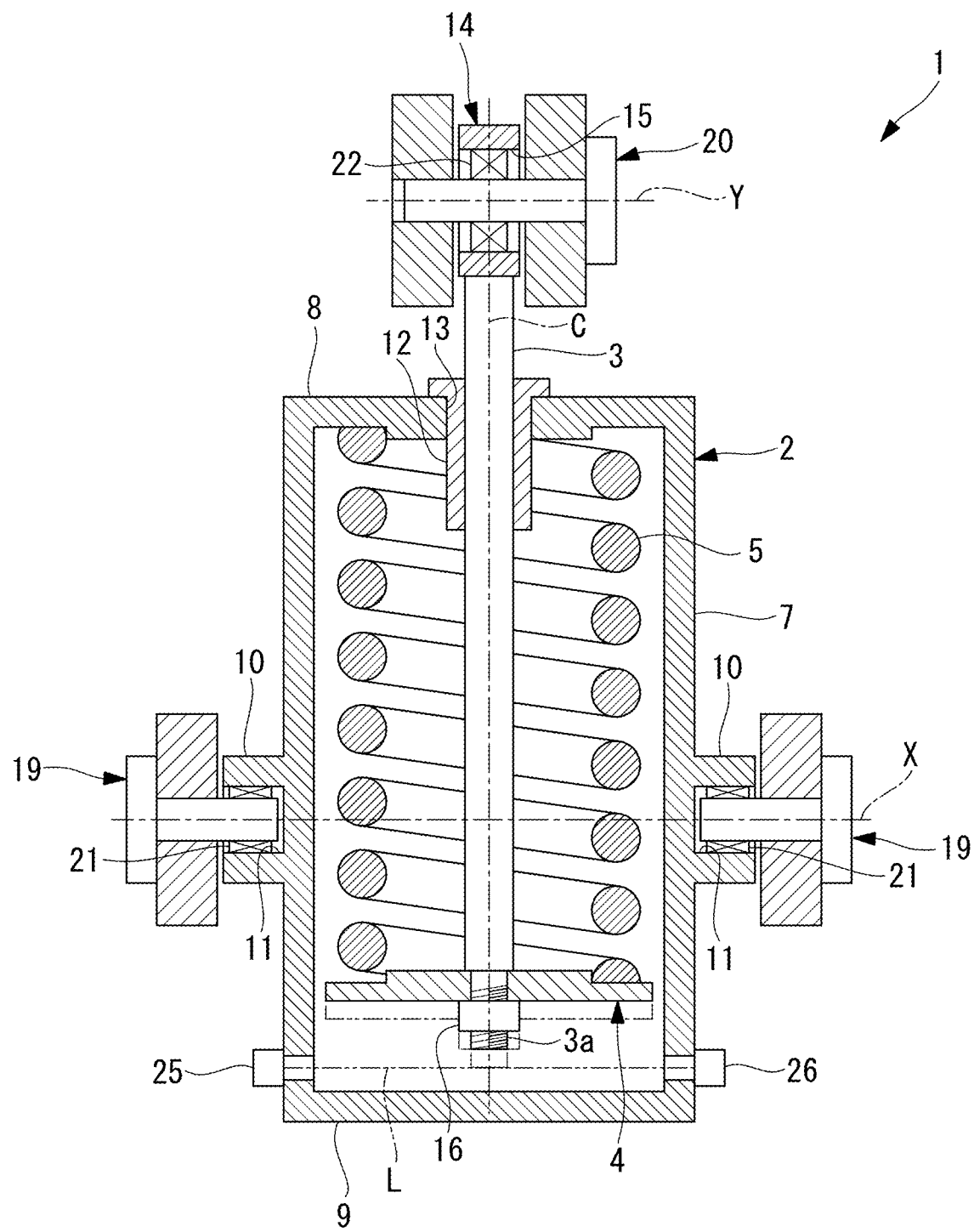
FIG. 9 is a longitudinal sectional view showing another modification of the sensor in the balancer in FIG. 2.

In addition, as shown in FIG. 9, an optical sensor may be employed as the sensor instead of the distance sensor 6, such as a laser displacement meter, the optical sensor being configured such that a light emitter 25 and a light receiver 26 are arranged on the body portion 7 of the housing 2 so as to face each other, and an optical axis L of light emitted from the light emitter 25 is disposed at a position beyond the stroke end of the rod 3. When the positional relationship between the housing 2 and the rod 3 changes due to the wear of the bearings 21, 22, the rod 3 (or the movable plate 4 or the nut 16) blocks the optical axis L, whereby it is possible to determine that the absolute value Δ of the difference has exceeded the threshold.

Figure 10:
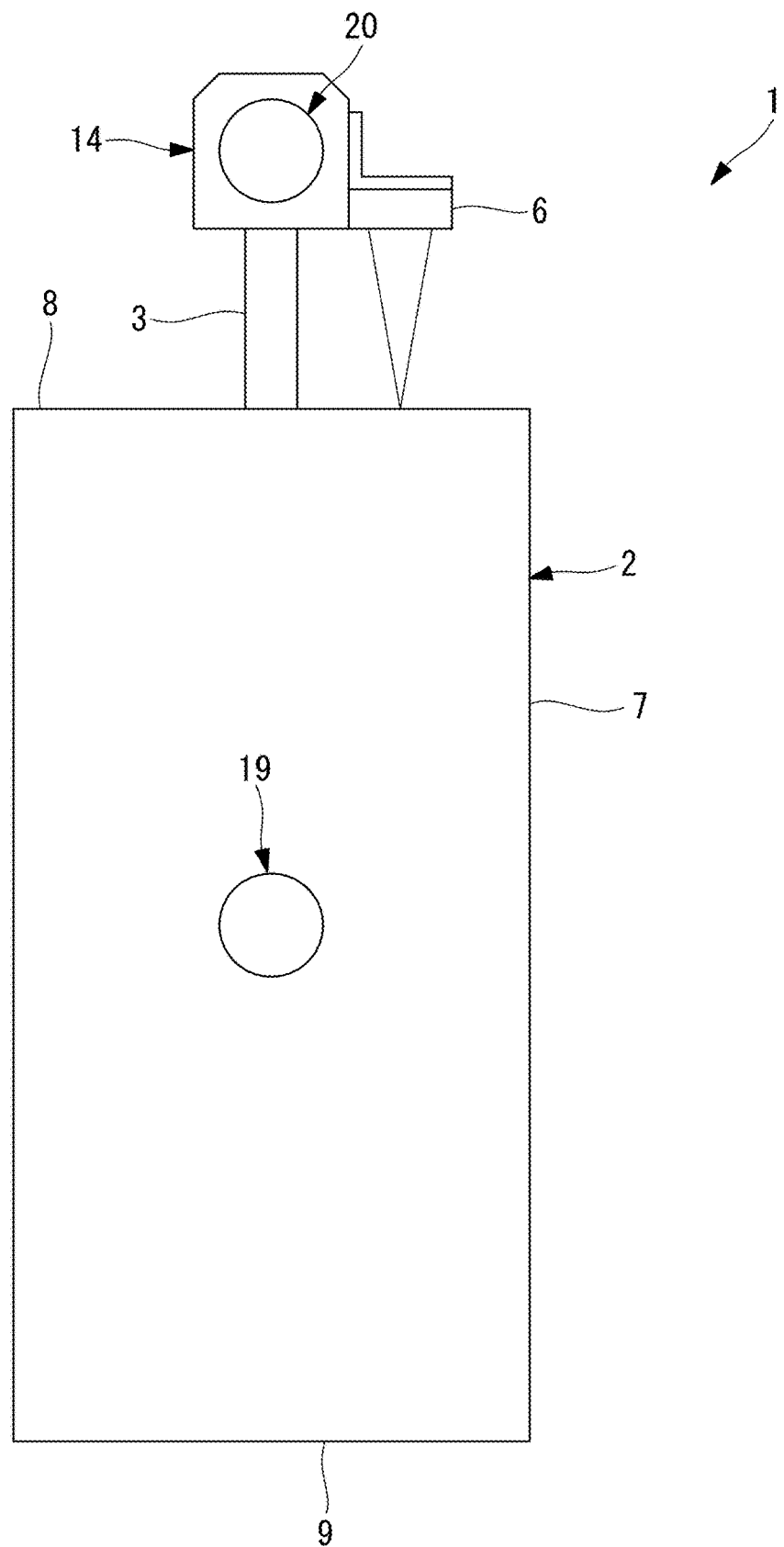
FIG. 10 is a longitudinal sectional view showing a modification of the arrangement of the sensor in the balancer in FIG. 2.

In addition, instead of detecting the distance between the rear end plate 9 and the rod 3 by means of the sensor 6, as shown in FIG. 10, the distance between the front end plate 8 and the attachment bracket 14 may be detected by the sensor 6. Because it is not necessary to place the sensor 6 in the interior of the housing 2, this modification can be applied in a case of employing, as the balancer 1, a gas balancer filled with gas, other than a spring balancer having a built-in compression coil spring 5.

In addition, in this embodiment, the positional relationship between the housing 2 and the rod 3 is detected by the sensor 6; thus, the occurrence of an abnormal state is determined on the basis of the total displacement of the displacement of the housing 2 with respect to the first shafts 19 and the displacement of the rod 3 with respect to the second shaft 20.

Figure 11:
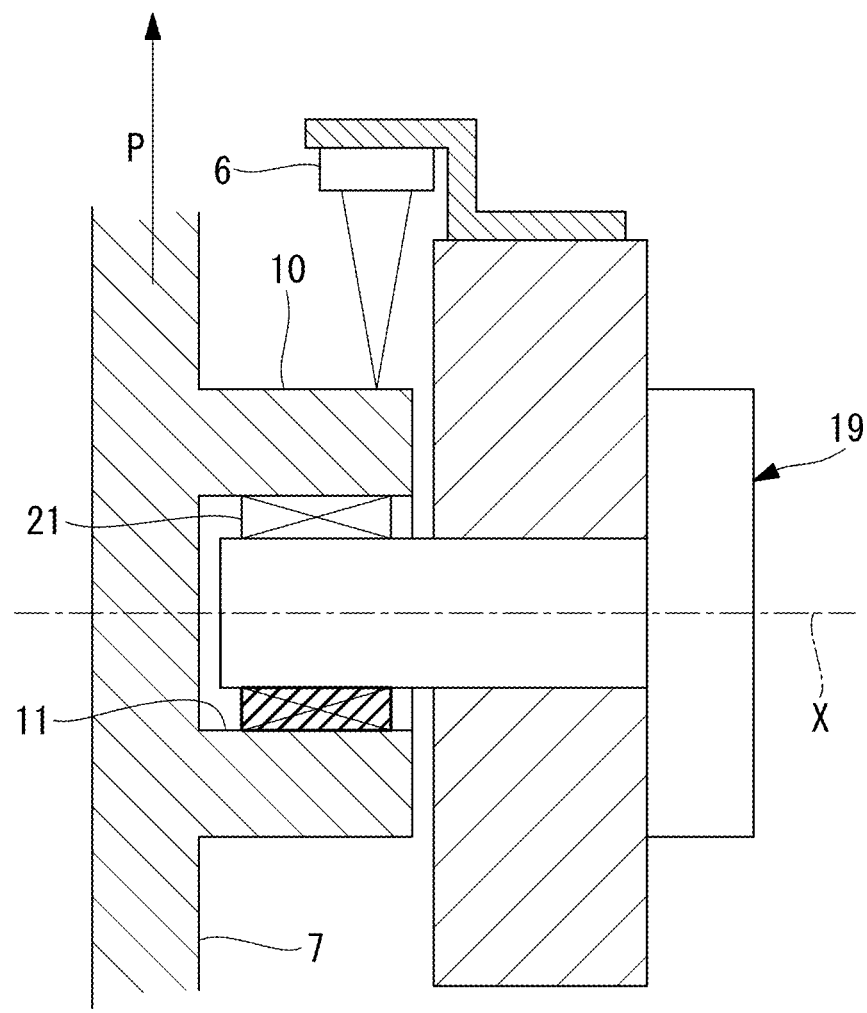
FIG. 11 is a partial longitudinal sectional view showing an arrangement example of a sensor that detects the distance between the housing and a first attachment axis, instead of the sensor in the balancer in FIG. 2.
Figure 12:
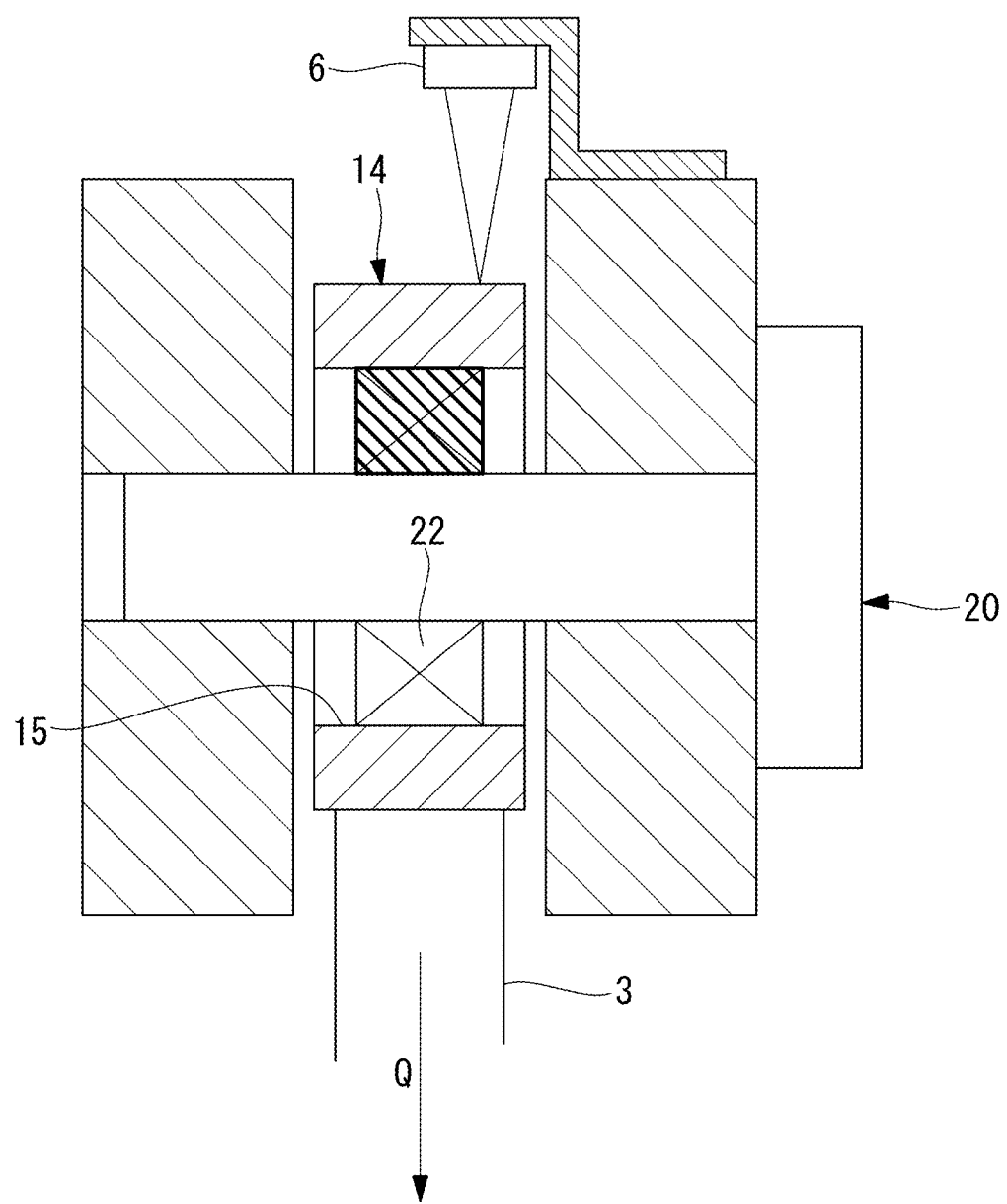
FIG. 12 is a partial longitudinal sectional view showing an arrangement example of a sensor that detects the distance between the rod and a second attachment axis, instead of the sensor in the balancer in FIG. 2.

Alternatively, as shown in FIG. 11, the distance between the first attachment axis X and an outer surface of the attachment portion 10 (the housing 2), in the axial direction of the housing 2 (a direction orthogonal to both the first attachment axis X and the second attachment axis Y), may be detected by the sensor 6. In addition, as shown in FIG. 12, the distance between the second attachment axis Y and an end surface of the attachment bracket 14 (the rod 3), in the axial direction of the rod 3 (a direction orthogonal to both the first attachment axis X and the second attachment axis Y), may be detected by the sensor 6. In addition, the distances shown in FIGS. 11 and 12 may be separately detected.

Because the degrees of wear of the bearings 21, 22 differ depending on the types of the supporting bearings 21, 22 or the difference in the load acting on each of the bearings 21, 22, the detection may be performed separately for each of the bearings 21, 22, and the occurrence of an abnormal state may be determined by using different thresholds. For example, the wear amount of the rolling bearing 22 is more likely to be larger than that of the sliding bearing 21, and in the example in FIG. 1, the wear amounts of the two sliding bearings 21 are sufficiently smaller than that of the single rolling bearing 22. Therefore, as a result of detecting changes in the distance for each of the bearings 21, 22 and determining the occurrence of an abnormal state by using different thresholds, it is possible to find the wear of the bearings 21, 22 individually and to take measures at an early stage.

In addition, although the vertical six-axis articulated robot has been illustrated as an example in this embodiment, the robot 110 may be of any type. In addition, although the housing 2 and the rod 3 are rotatably supported by the revolving drum 112 and the first arm 113, respectively, in this embodiment, the configuration may be reversed. In addition, although the position where the housing 2 is supported by the revolving drum 112 is set at an intermediate position in the axial direction of the housing 2 in this embodiment, the present invention may be applied to a balancer 1 supported at a position farther on the rear side than the rear end plate 9.

REFERENCE SIGNS LIST 1 balancer
2 housing
3 rod
4 movable plate (movable member)
5 compression coil spring (force generating means)
6 distance sensor (sensor)
7 body portion
8 front end plate (end plate)
9 rear end plate (end plate)
21 sliding bearing (first bearing)
22 rolling bearing (second bearing)
24 limit switch (switch, sensor)
25 light emitter (sensor)
26 light receiver (sensor)
100 robot system
110 robot
112 revolving drum (first member)
113 first arm (second member)
121 display (notification unit)
B second axis (rotation axis)
X first attachment axis
Y second attachment axis

The invention claimed is:

1. A balancer comprising:
a housing that is attached to one of a first member and a second member that is rotationally driven with respect to the first member about a rotation axis in a robot including the first member and the second member, so as to be rotatable, by means of first bearings, about a first attachment axis parallel to the rotation axis;
a rod that has one end attached to another one of the first member and the second member so as to be rotatable, by means of a second bearing, about a second attachment axis parallel to the rotation axis;
a force generator that generates a force in a direction in which the rod is drawn into the housing or in a direction in which the rod is pushed out of the housing; and
a sensor that detects a positional relationship between the first attachment axis and the housing and a positional relationship between the second attachment axis and the rod, in a direction orthogonal to the first attachment axis and the second attachment axis.

2. The balancer according to claim 1, wherein:
the housing includes a tubular body portion and an end plate that closes one end in an axial direction of the body portion;
a movable member fixed to another end of the rod, which is disposed inside the body portion, is provided; and
the force generator is a compression coil spring disposed between the end plate and the movable member.

3. The balancer according to claim 1, wherein the sensor is a distance sensor that detects a distance.

4. The balancer according to claim 1, wherein the sensor is a switch that detects the positional relationship when being in a prescribed state.

5. A robot system comprising:
a robot including the balancer according to claim 1; and
a notification unit that issues a notification indicating that an abnormal state has occurred, in a case in which a difference between the positional relationship detected by the sensor and the positional relationship in a normal state, in a state in which the first member and the second member are arranged at specific relative positions, exceeds a prescribed threshold.

* * * * *